(No Model.)

G. H. FELT.
POROUS CELL FOR GALVANIC BATTERIES.

No. 429,897. Patented June 10, 1890.

WITNESSES:
G. M. Copenhaver
Edwin L. Bradford

INVENTOR
George H. Felt
BY E. W. Cady
ATTORNEY.

UNITED STATES PATENT OFFICE.

GEORGE H. FELT, OF NEW YORK, N. Y., ASSIGNOR TO THE FELT ELECTRICAL COMPANY, OF SAME PLACE.

POROUS CELL FOR GALVANIC BATTERIES.

SPECIFICATION forming part of Letters Patent No. 429,897, dated June 10, 1890.

Application filed January 4, 1890. Serial No. 335,851. (No model.)

*To all whom it may concern:*

Be it known that I, GEORGE H. FELT, a citizen of the United States, residing at New York, in the county of New York and State of New York, have invented certain new and useful Improvements in Porous Cells for Galvanic Batteries; and I do hereby declare the following to be a full, clear, and exact description of the invention, such as will enable others skilled in the art to which it appertains to make and use the same.

The porous cell which I have invented is designed with the special objects of offering little resistance to the current and preventing polarization by the collection of hydrogen-bubbles on the surface of the cell and on the electrode contained therein. I secure these objects in part by virtue of the material of which the cell is made or the preparation given to ordinary cells, and in part by reason of the shape given to the bottom of the cell.

In carrying out my invention I prefer to employ for the material of the cell an oiled paper—such, for instance, as the heavier class of tracing-paper—though I have found that even the lightest tracing-paper will serve very well. This paper is impregnated with hydrocarbon oil, and I find that the hydrogen-bubbles which are set free by the electrolytic action of a battery have no affinity for it, and that it is practically impervious to them as well as to acids, while presenting little resistance to the internal current. For this reason they do not attach themselves to the cell nor pass through it, as is ordinarily the case, but can be detached with little difficulty. To facilitate this I construct the bottom of the cell of a dome shape, so that the bubbles forming below the cell will pass up inside the dome to the highest part, at which point a tube carries them off through the liquid of the cell. I may construct a cell of the described shape from other material besides that mentioned, or I may treat other materials—such as earthenware—with hydrocarbon oils.

I have illustrated my invention in the accompanying drawings, in which—

Figure 1:
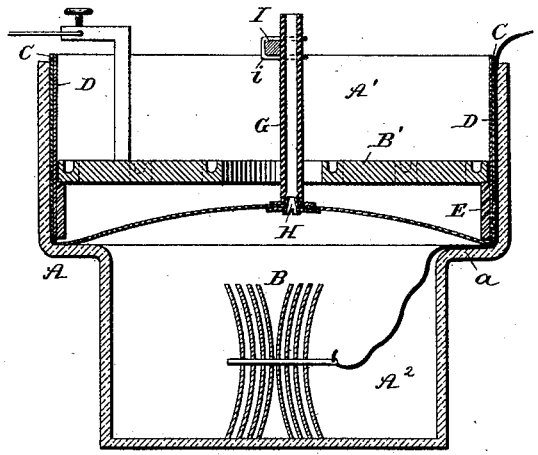
Figure 2:
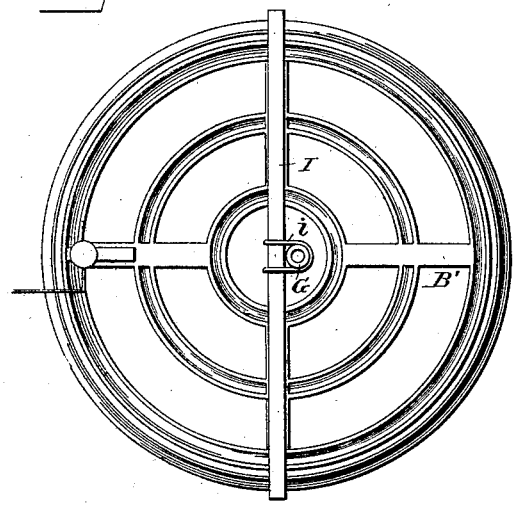
Figure 3:
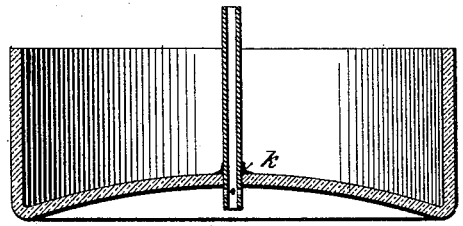
Figure 4:
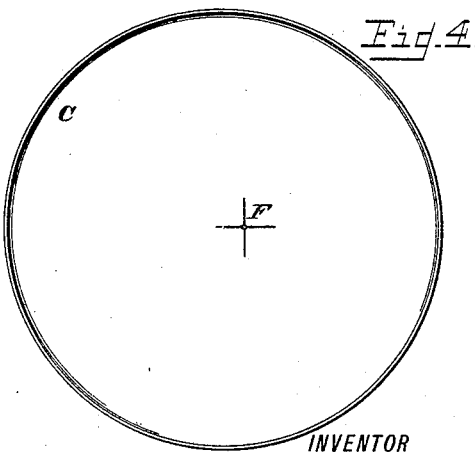
Figure 5:
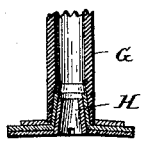
Figure 6:
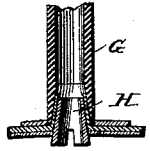
Figure 7:
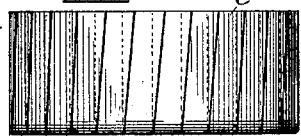

Figure 1 is a vertical section of a battery element containing my improved cell. Fig. 2 is a plan. Fig. 3 shows a modification. Figs. 4, 5, and 6 represent details; and Figs. 7 is a side elevation of the porous cell.

In the drawings, A is a battery-jar containing an upper chamber A' and a smaller lower chamber $A^2$, with a shoulder $a$ between the two. In the lower chamber is placed the negative electrode B—say of copper—and any suitable exciting-liquid. In the upper chamber is located my porous cell C, which is circular in shape and made of paper saturated with a hydrocarbon oil. I re-enforce the paper by an insulating-band D, of water-proof paper or other suitable insulating material which has sufficient stiffness to give strength to the cell at the sides. The whole is set in far enough for the bottom of the cell to rest on the shoulder $a$, and it is fixed in place by a hoop E, of hickory, or by an equivalent spring. On the hoop rests the positive electrode B'—say of zinc—and this is surrounded by any suitable exciting-fluid.

Before inserting the cell in place I take a sharp instrument and cut two slits across each other through the bottom of the cell, as shown at F in Fig. 4. I then take a tube G, of hard rubber, and having slightly reamed it out at the bottom I place it over the slits. I then press a conical tube H from below up into the tube G, thus making a tolerably firm connection between the said tube and the paper. The conical tube H is cut across at the bottom, making openings which extend up substantially as far as the bottom of the paper. If preferred, the conical tube may be so constructed that when it is pushed all the way up its lower end will be substantially flush with the bottom of the cell. (See Fig. 6.) In general I prefer to attach above and below the paper bottom washers of paper secured by means of paraffine or other cement.

Across the top of the entire cell I place a small bar or strip I, of wood or any other suitable material, and I attach the tube G to this bar by means of an ordinary rubber band $i$. In making the attachment I draw up the tube far enough to form the bottom of the cell into a dome shape, the summit of the dome being naturally at the point where the tube and cell-bottom are joined. In this instance I have shown the bar I placed across the middle of the cell, and the tube G being at one side this arrangement brings the point of union between the tube and the cell-bottom slightly away from the center. This, however, is a mere detail.

In Fig. 3 I show a section of a porous cell made of earthenware and having its bottom shaped into the form of a dome, and having a tube with its lower end just below or substantially flush with the lower surface of the cell. The tube in this instance is sealed into the bottom by means of wax, as shown at $k$. This earthenware may be saturated with a hydrocarbon oil, or not, as preferred. The action of the paper cell is by the oil which it contains to prevent the hydrogen-bubbles from attaching themselves to its surface or passing through into contact with the zinc, and by its shape to carry them to the tube, whence they are discharged into the atmosphere without detriment to the cell. Even without the tube the dome shape would have the advantage of collecting all the bubbles at one point, and without the oil and with the tube the same shape would be of advantage, though I prefer to use a substance that has been saturated with oil. I may also provide simply an opening at the top of the dome and dispense with the tube.

Fig. 7 shows an arrangement by means of which the paper cell is formed of a single piece. It will be seen that the sides of the cell are plaited, so as to take up the excess of material, while the bottom is a smooth piece, as shown in Fig. 4.

The zinc and copper electrodes have attached to them suitable wires for connecting them with an external circuit.

Having described my invention, I claim—

1. A porous cell having a dome-shaped bottom and a tube leading from the top of the dome through the cell, as and for the purpose set forth.

2. A porous cell having a dome-shaped bottom and an opening at substantially the highest point of the dome, as and for the purpose set forth.

3. A porous cell having a tube passing through it with its lower end substantially flush with the bottom of the cell, substantially as set forth.

In testimony whereof I have affixed my signature in presence of two witnesses.

GEORGE H. FELT.

Witnesses:
 G. H. STOCKBRIDGE,
 EDWIN L. BRADFORD.